United States Patent
Rosenholm

(10) Patent No.: US 11,643,904 B1
(45) Date of Patent: May 9, 2023

(54) DEGRADABLE DOWNHOLE TOOLS AND COMPONENTS FOR HIGH SALINITY APPLICATIONS

(71) Applicant: Workover Solutions, Inc., Imperial, PA (US)

(72) Inventor: Carl Andrew Rosenholm, Sugar Land, TX (US)

(73) Assignee: Workover Solutions, Inc., Imperial, PA (US)

( * ) Notice: Subject to any disclaimer, the term of this patent is extended or adjusted under 35 U.S.C. 154(b) by 373 days.

(21) Appl. No.: 17/031,620

(22) Filed: Sep. 24, 2020

Related U.S. Application Data

(60) Provisional application No. 62/905,761, filed on Sep. 25, 2019.

(51) Int. Cl.
*E21B 34/06* (2006.01)
*E21B 34/14* (2006.01)
(Continued)

(52) U.S. Cl.
CPC .............. *E21B 34/063* (2013.01); *C08K 3/08* (2013.01); *C08K 7/14* (2013.01); *C08L 29/04* (2013.01);
(Continued)

(58) Field of Classification Search
CPC ...... E21B 34/063; E21B 34/14; E21B 34/142; E21B 2200/08; C08K 3/08; C08K 7/14;
(Continued)

(56) References Cited

U.S. PATENT DOCUMENTS

| | | | | |
|---|---|---|---|---|
| 2011/0067889 A1* | 3/2011 | Marya | .................... | E21B 33/134 166/135 |
| 2012/0214715 A1* | 8/2012 | Luo | ........................ | E21B 33/138 507/260 |

(Continued)

OTHER PUBLICATIONS

Takahashi, Shinya, et al., "Degradation Study on Materials for Dissolvable Frac Plugs," Unconventional Resources Technology Conference, 2018, 9 pages.

(Continued)

*Primary Examiner* — Matthew R Buck
(74) *Attorney, Agent, or Firm* — Jones Walker LLP

(57) ABSTRACT

Degradable downhole tools, tool components, and balls are formed from a processed polyvinyl alcohol (PVA) compound that is degradable in a high-salinity environment. The PVA compound exhibits strength and elasticity properties that are comparable to existing degradable downhole polymers and further exhibits degradability properties that are superior to existing degradable downhole polymers, particularly in high-salinity fluids. For different components, the PVA compound may include a reinforcing material such as fiberglass. The PVA compound also includes a loading of degradable metal, such as a degradable magnesium alloy, rendering the material degradable at high salinity. Usage of tools, tool components, and balls formed from the disclosed materials eliminates the requirement that such equipment be drilled out after use as the PVA compound quickly degrades in high-salinity downhole fluids.

30 Claims, 6 Drawing Sheets

(51) Int. Cl.
*C08L 29/04* (2006.01)
*C08K 7/14* (2006.01)
*C08K 3/08* (2006.01)

(52) U.S. Cl.
CPC .... *E21B 34/142* (2020.05); *C08K 2003/0862* (2013.01); *C08L 2201/06* (2013.01); *E21B 2200/08* (2020.05)

(58) Field of Classification Search
CPC ............ C08K 2003/0862; C08L 29/04; C08L 2201/06
See application file for complete search history.

(56) References Cited

U.S. PATENT DOCUMENTS

| | | | |
|---|---|---|---|
| 2014/0190685 A1* | 7/2014 | Frazier | E21B 33/1208 |
| | | | 166/135 |
| 2017/0284167 A1* | 10/2017 | Takahashi | B32B 27/40 |
| 2018/0016662 A1 | 1/2018 | Qin et al. | |
| 2019/0169953 A1 | 6/2019 | Frazier | |
| 2020/0157912 A1* | 5/2020 | Mhaskar | E21B 33/1208 |
| 2021/0054714 A1* | 2/2021 | Nichols | E21B 33/1285 |

OTHER PUBLICATIONS

Technical Data Sheet for Mowiflex C-17, Kuraray America Inc., retrieved on Aug. 25, 2015, 2 pages, retrieved from <http://www.kuraray.eu/fileadmin/Downloads/Mowiflex/technical_data_sheets/TDS_C_17.pdf>.

\* cited by examiner

US 11,643,904 B1

DEGRADABLE DOWNHOLE TOOLS AND COMPONENTS FOR HIGH SALINITY APPLICATIONS

CROSS REFERENCE TO RELATED APPLICATIONS

This is a non-provisional of U.S. Provisional Patent Application Ser. No. 62/905,761, filed Sep. 25, 2019, which is incorporated herein by reference in its entirety, and to which priority is claimed.

FIELD OF THE INVENTION

This application relates to the field of degradable downhole tools and equipment and methods of manufacturing such tools and equipment. More particularly, the application relates to tools and equipment manufactured from degradable polymers and polymer composites that are useable in downhole operations in high salinity environments.

BACKGROUND

Recent advancements in hydrocarbon recovery techniques have enabled the production of hydrocarbons from reservoirs that could not be produced economically without the use of such techniques. In particular, hydraulic fracturing (or "fracking") involves the injection of a high pressure fluid (primarily water, proppants, and other job-specific compounds) to fracture a portion of a hydrocarbon-containing formation such that the desired hydrocarbons may be more easily recovered. Typically, multiple zones of a formation are independently isolated and fractured.

One common technique for isolating and fracturing different zones in a formation involves a process known as "plug-and-perf," which process is illustrated in FIG. 1. This process may be utilized with various different arrangements of hydrocarbon production conduits. For example, conduit 106 may be production casing that is cemented into wellbore 104, a liner that is cemented in wellbore 104, or a liner that is situated within an open wellbore 104 (perhaps with swell packers isolating the annuli between the various zones). The plug-and-perf process can also be utilized with other production conduit arrangements, as is known by those of ordinary skill in the art.

The plug-and-perf process begins by isolating the zone for which hydraulic fracturing is to be performed from lower zones in the wellbore 104. This is accomplished by lowering a plug 100 into the well. In the example illustrated in FIG. 1, plug 100A is lowered to a desired location within the production conduit 106 from the surface of the well via a conveying apparatus 102 such as wireline, slickline, or coiled tubing (step 150A). It should be noted that the example illustrated in FIG. 1 assumes that a zone downhole (as used herein the terms "downhole" and "uphole" refer to locations that are further from and closer to the surface of a well, respectively) from ZONE 1 is to be isolated from the hydraulic fracturing operation performed in ZONE 1.

The plug 100A is then mechanically actuated (e.g., using a setting tool) to cause the plug to engage the production conduit 106 and isolate the portion of the production conduit 106 below the plug 100A from the portion of the production conduit 106 above the plug 100A (step 150B). In the illustrated example, the plug 100A is set by driving the shoulder 112A, which is disposed circumferentially about a mandrel 110A, toward a lower end of the plug 100A. As the shoulder 112A is forced downward, the cone 120A is driven behind the slips 122A causing the slips 122A to move radially outward from the plug 100A. The slips 122A include teeth that engage the interior wall of the production conduit 106 to prevent downward movement of the plug 100A. In addition, the sealing member 118A, which is constructed from an elastomeric material such as nitrile rubber, becomes deformed and contacts the interior wall of the production conduit 106 to form a fluid tight seal between the mandrel 110A and the interior wall of the production conduit 106. As the shoulder 112A continues to be forced downward, the cone 116A is driven under the slips 114A causing the slips 114A to move radially outward from the plug 100A. The slips 114A include teeth that engage the interior wall of the production conduit 106 to prevent upward movement of the plug 100A. Many plugs include mechanical devices (e.g., shear pins, etc.) that ensure that actuation of the various components of the plug occurs in a desired order (e.g., actuation of bottom slips 122A followed by deformation of sealing member 118A followed by actuation of top slips 114A, etc.). When the plug 100A has been fully actuated, its position is maintained within the production conduit 106 by the friction force between the slips 114A, 122A and the production conduit 106 and the fluid pathway outside of the plug 100A is sealed by the sealing member 118A. Thus, the only fluid path from above the plug 100A to below the plug 100A is through the plug bore 128A. While a general plug design has been shown for purposes of illustration, it will be understood that numerous other plug designs are employed to accomplish the same task.

After the plug 100A has been set, the production conduit 106 is perforated to create a fluid pathway between the hydrocarbon-containing formation and the interior of the production conduit 106 (step 150C). The perforations 132 penetrate through the production conduit 106 and typically extend at least some distance into the formation. Typically, perforations 132 are formed using a perforation gun 126A (shown only symbolically in the example of FIG. 1). A perforation gun 126A includes shape charges that, upon ignition (e.g., from the surface via a wireline), produce a jet of high pressure, high velocity gas that penetrates into the formation. In plug-and-perf operations, it is common for the perforation gun 126A to be conveyed into the production conduit 106 on the same conveying apparatus 102 that is used to convey the plug 100A, although this is not strictly necessary.

After the production conduit has been perforated above the plug 100A, the conveying apparatus 102 and the perforating gun 126A are removed from the well. In order to isolate the portion of the production conduit 106 above the plug 100A from the portion below, a frac ball 134 is conveyed down the production conduit 106 in a fracture fluid (the frac ball having a slightly greater density than the fracture fluid) until it comes to rest on the ball seat 130 of the plug 100A (step 150D). The ball seat 130A is complementary to the ball 134A, which allows the ball 134A to form a seal that prevents fluid from flowing downward through the bore 128A. The fracture fluid flows into the formation through the perforations 132, and, as the pressure of the fracture fluid is increased (often to pressures of 10,000 psi or greater), fractures 136A are formed in the formation in ZONE 1. Proppants in the fracture fluid hold the fractures 136A open even after the fracture fluid is removed from the well, which enables hydrocarbons in the formation to be extracted more efficiently. It should be noted that the plug 100A is exposed to the extreme pressures required to generate the fractures 136A and therefore its components (including the ball 134A) must maintain their mechanical integrity when exposed to such pressures in order to maintain the isolation of the production conduit 106 to ensure that the fracturing operation is focused on the intended zone.

After ZONE 1 has been fractured (i.e., fractures 136A have been formed), plug 100B is conveyed into the production conduit 106 on the conveying apparatus 102 to a desired location between the surface and the fractures 136A (step 150E). The process of plugging, perforating, and fracturing is then repeated to isolate and fracture each zone, moving in an uphole direction. When all of the zones have been fractured, the plugs must be milled or drilled out to enable hydrocarbons to flow to the surface of the well through the production conduit. While FIG. 1 illustrates a vertical portion of a well, hydraulic fracturing is often employed in horizontal portions of a well. It is not uncommon for a particular well, especially a horizontal well, to have 30-40 zones in which hydraulic fracturing is performed. Therefore, milling or drilling the numerous plugs can be a time-consuming and expensive operation. As such, there have been efforts to develop hydraulic fracturing techniques that avoid this requirement.

The first such technique employs sliding sleeve devices 200 as illustrated in FIG. 2. The sliding sleeve technique differs from the plug and perf technique in that the sliding sleeve devices 200 are integrated with the production conduit 106. For example, each sliding sleeve device 200 may be threaded to a string of the production conduit 106 (e.g., a liner) at its top and bottom ends. In the illustrated example, the sliding sleeve devices 200 are installed as part of the production conduit 106 in an open (i.e., uncemented and uncased) wellbore 104. In this type of application, the annulus between the production conduit 106 and the wellbore 104 may be sealed by packers 202 that separate the zones. Because the sliding sleeve devices 200 are integrated with the production conduit 106, additional planning and labor (as compared to the plug and perf technique) are required during the completion process to ensure that the sliding sleeve devices 200 are adjacent to zones to be stimulated and the packers 202 separate the various zones.

Although the sliding sleeve technique requires additional planning and labor during the completion process, it also simplifies the hydraulic fracturing process. In its initial state, a sliding sleeve 212A that is disposed within the body 214A of the sliding sleeve device 200A blocks radial ports 216A that extend through the body 214A, thus preventing fluid communication from the interior of the production conduit 106 to the wellbore 104 (step 250A).

The hydraulic fracturing process is initiated by conveying a frac ball 234A into the production conduit 106 with fracture fluid. This process is similar to the conveyance of the frac ball 134A into the production conduit 106 in the plug and perf process described with respect to FIG. 1. However, in the sliding sleeve technique, each frac ball 234 must pass through each of the sliding sleeve devices 200 located uphole from the sliding sleeve device 200 with which the ball is designed to mate (i.e., the ball's corresponding sliding sleeve device). Therefore, a frac ball 234 must have a diameter $D_{234}$ that is smaller than the diameter $D_{230}$ of each uphole ball seat 230 but greater than the diameter $D_{230}$ of the ball seat 230 of its corresponding sliding sleeve device 200 (i.e., $D_{230D}$, $D_{230C}$, and $D_{230B}$>$D_{234A}$>$D_{230A}$). In order for this to be accomplished at each zone, the diameters $D_{230}$ of the ball seats 230 must be progressively smaller at increasing distances from the surface of the well (i.e., $D_{230D}$>$D_{230C}$>$D_{230B}$>$D_{230A}$, etc.).

After the ball 234A passes through the uphole sliding sleeve devices 200, it comes to rest on the ball seat 230A of the sliding sleeve device 200A (step 250B). Because the ball 234A cannot pass through the seat 230A, it forms a seal that prevents fluid from flowing downward through the sliding sleeve device 200A. As the pressure of the fracture fluid is increased, it is exerted in a downward direction on the ball 234A, which causes the sliding sleeve 212A to shift downward until the shoulder 236A of the sliding sleeve 212A contacts the shoulder 238A of the body of the sliding sleeve device 200A (step 250C). In the shifted position, the radial ports 216A are open to the interior of the sliding sleeve device 200A, thus enabling fluid communication from the interior of the production conduit 106 to the wellbore 104. The fracture fluid flows into the formation through the radial ports 216A, but the ball 230A continues to prevent fluid flow through the sliding sleeve device 200A and the packers 202A (not shown) and 202B prevent fluid flow in the annulus between the production conduit 106 and the wellbore 104. Consequently, the pressure of the fracture fluid acts only on the formation within ZONE 1, and, as the pressure is increased (often to pressures of 10,000 psi or greater), fractures 136A are formed in the formation. Just as with the plug and perf technique described above, proppants in the fracture fluid hold the fractures 136A open even after the fracture fluid is removed from the well, which enables hydrocarbons in the formation to be extracted more efficiently. Here again, it should be noted that the sliding sleeve device 200A is exposed to the extreme pressures required to generate the fractures 136A and therefore its components (including the ball 234A) must maintain their mechanical integrity when exposed to such pressures in order to maintain the isolation of the production conduit 106 to ensure that the fracturing operation is focused on the intended zone.

After ZONE 1 has been fractured (i.e., fractures 136A have been formed), the sliding sleeve process is repeated for the immediate uphole sliding sleeve device 200B (steps 250D through 250F) to isolate and fracture each zone, moving in the uphole direction. After all of the zones have been fractured, fluid is circulated in the reverse direction (i.e., the uphole direction) to remove the balls 234 from the production conduit. While the sliding sleeve technique is designed to eliminate the need for milling or drilling components after hydraulic fracturing is complete, it is not uncommon for a ball 234 to become lodged at some point in the production conduit 106. Again, while FIG. 2 illustrates a vertical portion of a well, the sliding sleeve technique is often employed in horizontal wells, which increases the difficulty in deploying and retrieving the balls 234. If a ball 234 does become lodged, it may not be possible to retrieve any of the balls that are located downhole of the lodged ball 234. Therefore, it may still be necessary to mill or drill the balls 234 in order to enable hydrocarbons to be produced.

Therefore, balls and tool components that are dissolvable or degradable in certain fluids have been introduced for use in either plug and perf or sliding sleeve hydraulic fracturing jobs. As noted above, the balls and tool components are subjected to extreme pressures during the hydraulic fracturing process. Therefore, degradable components must be capable of withstanding these conditions before they degrade. Various different types of degradable components have been introduced.

Bubbletight, LLC, assignee of the present application, manufactures tools and balls using a degradable composite metal. The degradable composite metal has exceptional strength characteristics and is useful in a variety of applications. However, it requires a high chloride solution or an acidic solution in order to degrade in a reasonable time period and it is relatively expensive.

Polymers have also been utilized to manufacture degradable downhole tools and components. One notable degradable polymer that has been utilized for tools and balls is polyglycolic acid (PGA). While PGA has reasonable strength and is less expensive than degradable metal balls, it requires high temperatures (>180° F.) to degrade and even under those conditions it degrades slowly. Polylactic acid (PLA) has also been suggested for use in downhole tools. However, PLA exhibits poor strength and poor degradability and therefore downhold applications have generally been limited to use as a diverter polymer.

While degradable balls and tools have been described in the context of their use in hydraulic fracturing operations, there are also other operations in which degradable downhole tools may be employed. There is therefore a need in the art for degradable downhole tools and components that have desirable strength and degradability properties.

SUMMARY

Disclosed herein is a tool comprising: at least one component made of a composite PVA compound comprising polyvinyl alcohol (PVA) and a degradable metal. According to some embodiments, the degradable metal is magnesium or a magnesium alloy. According to some embodiments, the degradable metal is a magnesium alloy comprising magnesium and one or more of aluminum, zinc, iron, copper, nickel, zinc, tungsten, and zirconium. According to some embodiments, the degradable metal comprises magnesium doped with nickel. According to some embodiments, the composite PVA compound comprises 0.01 to 2.5% by weight of the degradable metal. According to some embodiments, the downhole tool is a wellbore isolation device selected from a frac plug and a frac ball. According to some embodiments, the downhole tool is selected from the group consisting of a wellbore isolation device, a completion tool, a drill tool, a testing tool, a slickline tool, a wireline tool, an autonomous tool, a tubing conveyed perforating tool, and any combination thereof. According to some embodiments, the at least one component is selected from the group consisting of a mandrel of a packer or plug, a spacer ring, a slip, a wedge, a retainer ring, an extrusion limiter or backup shoe, a mule shoe, a ball, a flapper, a ball seat, a sleeve, a perforation gun housing, a cement dart, a wiper dart, a sealing element, a wedge, a slip block, a logging tool, a housing, a release mechanism, a pumpdown tool, an inflow control device plug, an autonomous inflow control device plug, a coupling, a connector, a support, an enclosure, a cage, a slip body, a tapered shoe, and any combination thereof. According to some embodiments, the downhole tool comprises: a body having an axial bore extending therethrough; one or more slips arranged about the body and configured to extend radially to engage an interior wall of a wellbore conduit; and a sealing member configured to form a seal between an outer surface of the body and the interior wall of the wellbore conduit, wherein at least a portion of one or more of the body, the one or more slips, and the sealing member are formed from the composite PVA compound. According to some embodiments, the one or more slips are formed from the composite PVA compound and include one or more pockets configured to accept a gripping material. According to some embodiments, the gripping material is a metal or ceramic material. According to some embodiments, the composite PVA compound further includes a reinforcing material. According to some embodiments, the reinforcing material is fiberglass. According to some embodiments, the composite PVA compound comprises between 5 and 60% fiberglass by weight. According to some embodiments, the composite PVA compound comprises a long fiber reinforced PVA compound. According to some embodiments, the body comprises a seat configured to accept a ball to block fluid passage through the axial bore in a downhole direction. According to some embodiments, the body comprises a first portion formed from the composite PVA compound and a second portion formed from a different material. According to some embodiments, the first portion comprises a cylindrical extrusion having an axial bore and external threads that are configured to engage internal threads in the second portion. According to some embodiments, the composite PVA compound further comprises a blend polymer. According to some embodiments, the blend polymer is polycaprolactam. According to some embodiments, the composite PVA compound comprises between 1 and 25% polycaprolactam by weight.

Also disclosed herein is a downhole tool, comprising: a substantially spherical ball formed from a composite PVA compound that comprises polyvinyl alcohol (PVA) and a degradable metal and is configured to form a fluid tight seal when positioned within a seat of a plug in a wellbore conduit. According to some embodiments, the degradable metal is magnesium or a magnesium alloy. According to some embodiments, the degradable metal is a magnesium alloy comprising magnesium and one or more of aluminum, zinc, iron, copper, nickel, zinc, and zirconium. According to some embodiments, the degradable metal comprises magnesium doped with nickel. According to some embodiments, the composite PVA compound comprises 0.01 to 2.5% by weight of the degradable metal. According to some embodiments, the composite PVA compound further comprises a fiberglass reinforcing material. According to some embodiments, According to some embodiments, the ball has a diameter between 0.875 and 5 inches. According to some embodiments, the PVA compound comprises a long fiber reinforced PVA compound.

Also disclosed is a method of dissolving a downhole tool, the method comprising: disposing the tool in a wellbore, wherein the tool comprises at least one component made of a composite PVA compound comprising polyvinyl alcohol (PVA) and a degradable metal; contacting the tool with an aqueous fluid having a salinity of greater than 5% and a temperature of less than 100° F., wherein the tool has a rate of corrosion (ROC) of 0.5 to 50 mg/cm2/hour. According to some embodiments, the fluid has a salinity of 10% or greater. According to some embodiments, the fluid has a temperature of less than 80° F. According to some embodiments, the tool has a ROC of 0.5 to 50 mg/cm2/hour in fluid having a salinity of at least 10% and a temperature of less than 80° F.

Also disclosed herein is a tool, comprising: at least one component made of a composite PVA material, wherein the composite PVA material is selected from the group consisting of: (1) composite PVA materials consisting of polyvinyl alcohol (PVA) and a degradable metal; (2) composite PVA materials consisting of PVA, a degradable metal, and fiberglass reinforcing material; (3) composite PVA materials consisting of PVA, a degradable metal, and a mineral fill material; and (4) composite PVA materials consisting of PVA, a degradable metal, a fiberglass reinforcing material, and a mineral fill material. According to some embodiments, the degradable metal is magnesium or a magnesium alloy. According to some embodiments, the degradable metal is a magnesium alloy comprising magnesium and one or more of aluminum, zinc, iron, copper, nickel, zinc, tungsten, and zirconium. According to some embodiments, the degradable metal comprises magnesium and nickel. According to some embodiments, the composite PVA material has 0.01 to 2.5% by weight of the degradable metal. According to some embodiments, the composite PVA material has between 5 and 60% fiberglass by weight. According to some embodiments, the mineral fill material is selected from the group consisting of pulverized glass, solid glass spheres, hollow glass spheres, barium sulfate, calcium carbonate, calcium sulfate, mica, pigments and dispersions, precipitate silica, talc, titanium dioxide, wollastonite, clays, aluminum hydroxide, magnesium hydroxide, magnesium hydroxide, natural calcium carbonate and dolomite, kaolin, fumed silica, cristobalite, quartz, precipitated calcium carbonate, and calcined clay. According to some embodiments, the composite PVA material has a rate of corrosion (ROC) of 0.5 to 50 mg/cm2/hour in an aqueous fluid having a salinity of greater than 5% and a temperature of less than 100° F. According to some embodiments, the composite PVA material has a ROC of 0.5 to 50 mg/cm2/hour in fluid having a salinity of at least 10% and a temperature of less than 80° F. According to some embodiments, the at least one component is selected from the group consisting of a mandrel of a packer or plug, a spacer ring, a slip, a wedge, a retainer ring, an extrusion limiter or backup shoe, a mule shoe, a frac ball, a flapper, a ball seat, a sleeve, a perforation gun housing, a cement dart, a wiper dart, a sealing element, a wedge, a slip block, a logging tool, a housing, a release mechanism, a pumpdown tool, an inflow control device plug, an autonomous inflow control device plug, a coupling, a connector, a support, an enclosure, a cage, a slip body, a tapered shoe, and any combination thereof. According to some embodiments, the downhole tool is selected from the group consisting of a wellbore isolation device, a completion tool, a drill tool, a testing tool, a slickline tool, a wireline tool, an autonomous tool, and a tubing conveyed perforating tool. According to some embodiments, the downhole tool comprises: a body having an axial bore extending therethrough; one or more slips arranged about the body and configured to extend radially to engage an interior wall of a wellbore conduit; and a sealing member configured to form a seal between an outer surface of the body and the interior wall of the wellbore conduit, wherein the at least one component is selected from the body, the one or more slips, and the sealing member. According to some embodiments, the at least one component comprises slips and wherein the slips include one or more pockets configured to accept a gripping material. According to some embodiments, the gripping material is a metal or ceramic material.

DESCRIPTION

Figure 1:
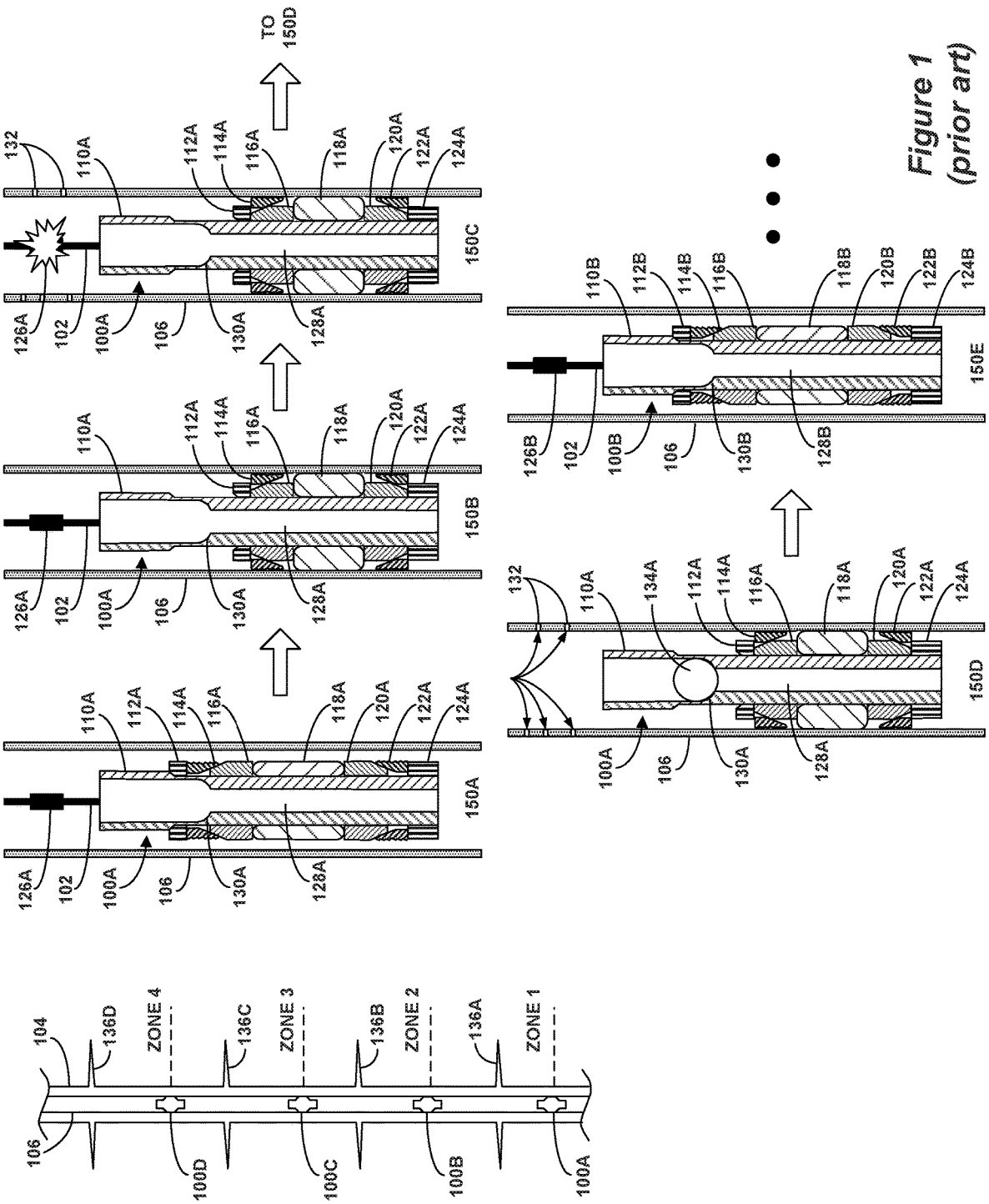
FIG. 1 is a diagram illustrating the steps of a plug and perf hydraulic fracturing operation.

In the preceding description as well as the description that follows, corresponding items (i.e., different instances of the same type of item) are labeled using the same numeric designator. Where necessary for purposes of clarity, different instances of corresponding items are labeled with a suffix following the numeric designator. Throughout the disclosure, the suffix may be omitted when describing an item generically rather than a specific instance of the item.

The inventor has determined that polyvinyl alcohol (PVA) exhibits desirable strength and degradability properties for use in tools, tool components, and balls for downhole applications. In particular, and as will be described in greater detail below, the inventor has determined that fiberglass-reinforced PVA compounds can be utilized to create downhole tools, tool components, and balls that exhibit desirable strength and degradability properties. In addition, the inventor has determined that certain PVA compounds can also be utilized to manufacture degradable sealing elements (i.e., flexible components).

PVA is a water-soluble polymer having an ideal formula of $[CH_2CH(OH)]_n$. PVA's repeat unit includes a hydroxyl functional group having a random stereochemistry along the polymer chain (i.e., PVA is atactic). PVA is generally produced by a two-step process: 1) the polymerization of vinyl acetate to form polyvinyl acetate and 2) the hydrolysis of the acetate groups in the polyvinyl acetate to form PVA. The properties of PVA are highly dependent on its molecular weight and the degree of hydrolysis (i.e., the percentage of acetate groups that are hydrolyzed). The molecular weight of PVA is controlled by controlling the vinyl acetate polymerization reaction and the degree of hydrolysis is controlled by controlling the extent of the hydrolysis reaction. As molecular weight and/or the degree of hydrolysis increases, PVA exhibits increased viscosity, increased tensile strength, and increased water and solvent resistance. As molecular weight and/or the degree of hydrolysis decreases, PVA exhibits decreased viscosity, increased flexibility, and increased solubility. PVA can be categorized based upon its degree of hydrolysis as fully hydrolyzed (e.g., >97 mol %), medium hydrolyzed (e.g., 95 to 97 mol %), and partially hydrolyzed (e.g., 85 to 95 mol %).

The inventor has specifically observed beneficial properties of the following raw PVA compounds for uses in different applications in downhole operations: Kuraray Mowiflex C 17 (formerly Mowiflex TC 253), Kuraray Mowiflex C 30 (formerly Mowiflex TC 232), and Kuraray Mowiflex H 15. The Mowiflex C 17 PVA compound contains greater than 96 wt % PVA and has a glass transition temperature of 62° C., a density of 0.6 to 0.9 g/cm³, and a melt flow index of 14-20 g/10 min at 190° C. and a load of 21.6 kg. The Mowiflex C 30 PVA compound contains approximately 75 wt % PVA, 20 wt % aliphatic polyols (plasticizer), and 5 wt % calcium stearate (lubricant) and has a glass transition temperature of 35° C., a density of 0.6 to 0.9 g/cm³, and a melt flow index of 20-40 g/10 min at 190° C. and a load of 21.6 kg. The Mowiflex H 15 PVA compound has a melt flow index of approximately 15 g/10 min at 230° C. and a load of 2.16 kg. The melt flow index values of these raw PVA compounds may be determined in accordance with the ASTM D1238 and/or ISO 1133 test procedures. The properties of the C 17 and C 30 raw PVA compounds are listed in data sheets which are submitted in an information disclosure statement in conjunction with the filing of this application and which are incorporated herein by reference. While these specific grades of PVA compounds are described for purposes of illustration, it will be understood that other types and grades of raw PVA compounds are also suitable materials for manufacturing the types of tools, tool components, and balls for downhole operations described in this application. As used herein, the term raw PVA compound refers to an initial material that contains an appreciable quantity of PVA (such as those described above), which is typically supplied by a PVA manufacturer in powder or pelletized form and which can be shaped into a final product or further processed before final shaping. It will be appreciated from the above examples that raw PVA compounds may include materials other than PVA and may include PVA of varying molecular weights and degrees of hydrolysis. Raw PVA compounds can be processed by blending with other polymers and/or adding colorants, fillers, or reinforcing materials to obtain a processed PVA compound having the desired properties. Thus, as used herein, the term processed PVA compound refers to a PVA compound that has been processed to include these various additional materials and may exist as a pellet, a melt, a powder, or a final shaped component. The term PVA compound may refer to either a raw PVA compound or a processed PVA compound.

Figure 3:
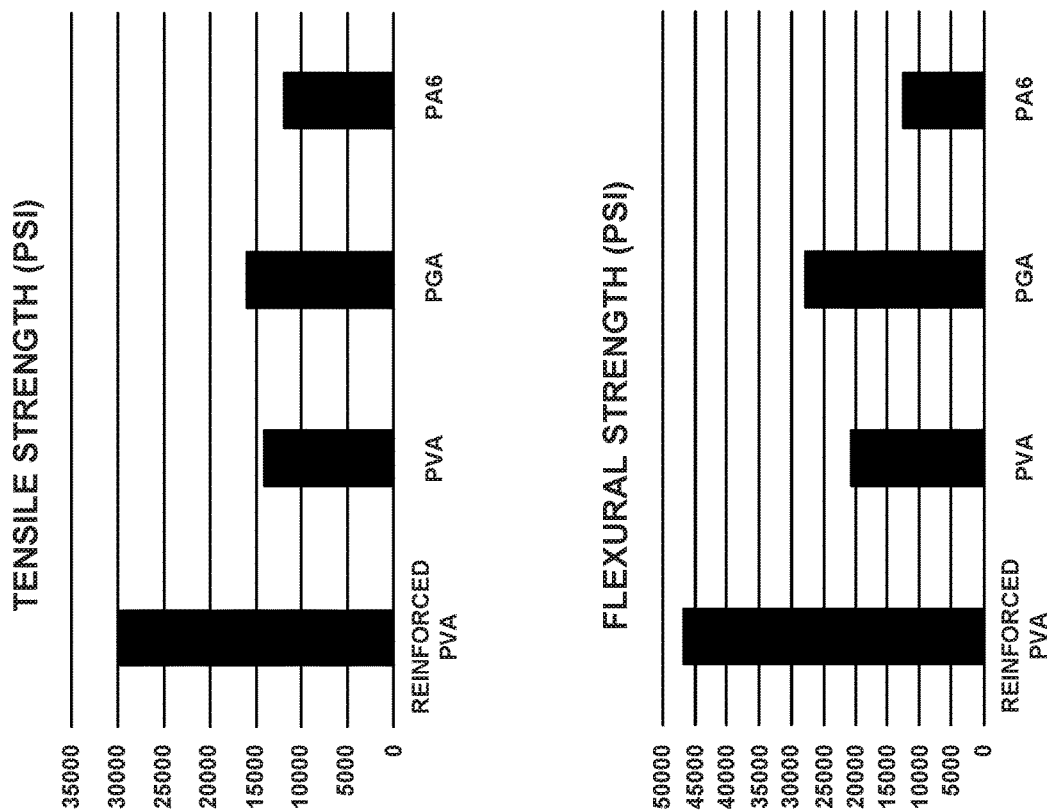
FIG. 3 is a graph showing the strength and elasticity of components utilizable in degradable downhole tools and components in accordance with an embodiment of the disclosure.

Referring to FIG. 3, the inventor has observed that a processed PVA compound that includes a fiberglass reinforcing material exhibits strength and elasticity properties that are comparable to materials that are used in the manufacture of commercially available degradable downhole components. For example, the fiberglass-reinforced processed PVA compound has a tensile strength of approximately 30,000 psi, which exceeds the tensile strength of pure PVA (approximately 14,000 psi), PGA (approximately 16,000 psi), and PA6 (Nylon 6) (approximately 12,000 psi). The fiberglass-reinforced processed PVA compound additionally exhibits a flexural strength of approximately 47,000 psi, which exceeds the flexural strength of pure PVA (approximately 21,000 psi), PGA (approximately 28,000 psi), and PA6 (Nylon 6) (approximately 12,300 psi). As such, the fiberglass-reinforced processed PVA compound's strength characteristics render it suitable for use in manufacturing degradable downhole tools, tool components, and balls. It has also been observed that the elasticity of the fiberglass-reinforced processed PVA compound renders it suitable for use in downhole applications while also decreasing the susceptibility of components manufactured from the processed PVA compound to shear failure. The specific gravity of components and balls produced from the fiberglass-reinforced processed PVA compound is approximately 1.6 to 1.7, which allows balls produced from the processed PVA compound to be conveyed downhole in standard fracture fluids. As will be described in greater detail below, the specific gravity of balls and components manufactured from the fiberglass-reinforced processed PVA compound can be altered to meet specific requirements by making minor modifications to the manufacturing process.

In addition, the fiberglass-reinforced processed PVA compound exhibits superior degradability relative to existing degradable downhole tools and components. In a test environment, a 7/8" diameter ball was observed to completely dissolve in 175° F. water in eight hours while another 7/8" diameter ball was reduced to 5/8" diameter in 24 hours in 70° F. water. Components formed from the fiberglass-reinforced processed PVA compound begin to degrade (i.e., dissolve) in water at ambient conditions (i.e., 70° F.). Relatively low temperature fracture fluid has little or no effect on the structural integrity of components formed from the fiberglass-reinforced processed PVA compound. However, when such components are exposed to fluids at increased temperatures, they degrade quickly. These properties make the fiberglass-reinforced processed PVA compound ideally suited for use in downhole applications such as hydraulic fracturing because the temperature of the fresh fracture fluid acts to inhibit degradation of the components during the hydraulic fracture operation and to enable degradation after the operation is complete and fluid temperatures increase. The degradation rate of the fiberglass-reinforced processed PVA compound can be modified through the addition of a material such as polyethylene or PA6. Moreover, PVA is biodegradable and is harmless at the extremely low concentrations that would result from the dissolution of relatively small components in a large volume of fluid. In addition, the small quantities of glass fibers are flushed back to the surface and are largely undetectable.

Figure 2:
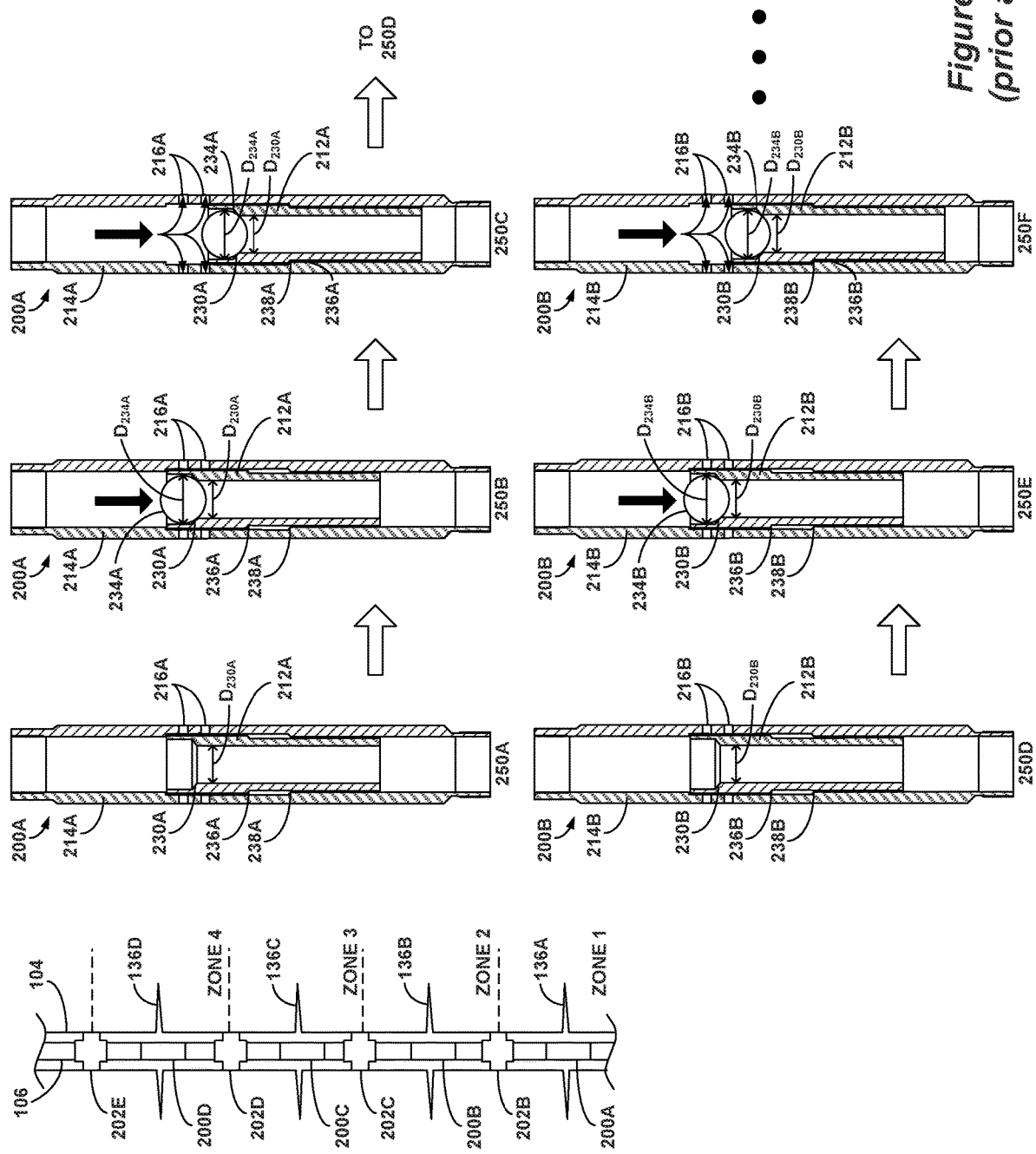
FIG. 2 is a diagram illustrating the steps of a sliding sleeve hydraulic fracturing operation.
Figure 4:
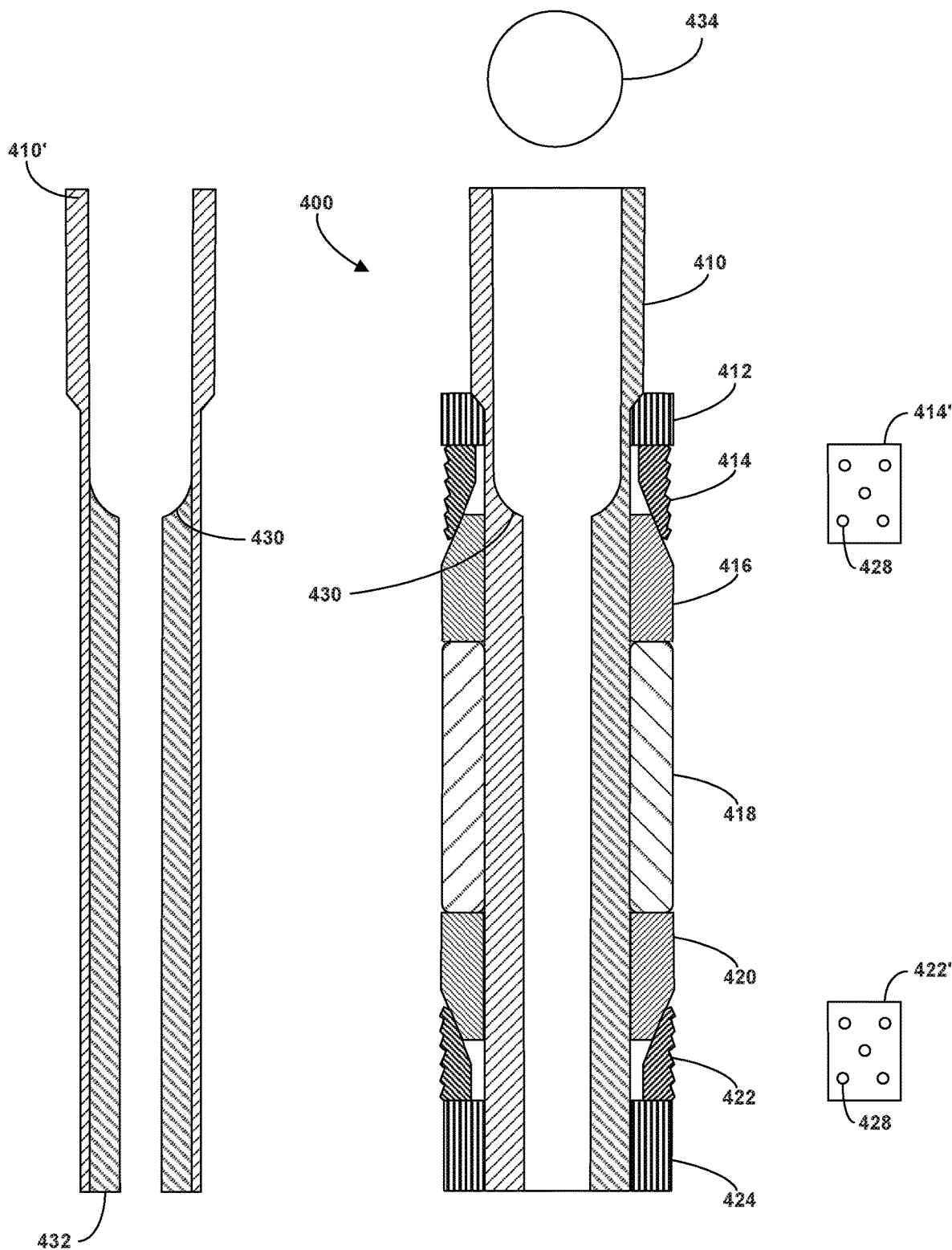
FIG. 4 is a cross-sectional view of a plug and ball that may be formed wholly or partially from a degradable material in accordance with an embodiment of this disclosure.

Referring to FIG. 4, a cross-sectional view of a plug 400 and a ball 434 for use in a downhole operation (e.g., a hydraulic fracturing operation) is depicted. The ball 434 and the components of the plug 400 are examples of components that may be formed from a PVA compound. It will be noted that the plug 400 has the same structure as the plugs 100 described above with respect to FIG. 1. The structure of the plug 400 depicted in FIG. 4 is provided for purposes of illustration only and is not intended to be limiting. Rather, and as will be described in greater detail below, the manufacturing processes associated with PVA compounds enable the creation of structures having practically any shape or size. Thus, using the manufacturing processes disclosed herein, a degradable version of nearly any existing or newly-conceived downhole tool or tool component may be generated from a PVA compound by molding or extruding and machining components of tools that are currently manufactured from different materials. It will be understood that such components can be utilized to perform the operations described above with respect to FIGS. 1 and 2 (i.e., plug and perf and sliding sleeve hydraulic fracturing) as well as other downhole operations in which degradable components may be useful.

As described above with respect to FIG. 1, the main body of the plug 400 is formed by a mandrel 410 through which an axial bore extends and about which additional components are arranged. Again, these additional components include upper and lower shoulders 412 and 424, slips 414 and 422, cones 416 and 420, and sealing element 418. In one embodiment, each component of the plug 400 as well as the ball 434 may be formed from a PVA compound. For example, in one embodiment, the ball 434 and the structural components of the plug 400 (mandrel 410, shoulders 412 and 424, slips 414 and 422, and cones 416 and 420) may be formed from a rigid fiberglass-reinforced PVA compound, which may be produced from a long fiber reinforced or a short fiber reinforced PVA compound with 5-60 wt % fiberglass. It has been determined that PVA compounds in which the PVA component has a higher molecular weight and/or a higher degree of hydrolysis (e.g., medium or fully hydrolyzed), such as the Mowiflex C 17 compound, are particularly well-suited for use in manufacturing such structural components, although other PVA compounds are also suitable. While the ball 434 and structural components of the plug may be formed from a PVA compound that includes a reinforcing material such as fiberglass, the reinforcing material is not essential and the ball 434 and structural components of the plug may also be formed from a PVA compound that does not include a reinforcing material.

In one embodiment, the sealing element 418 may be formed from a more flexible PVA compound. Therefore, the mandrel 410, shoulders 412 and 424, slips 414 and 422, and/or cones 416 and 420, may be formed from a first PVA compound and the sealing element 418 may be formed from a second, different PVA compound. It has been determined that PVA compounds in which the PVA component has a lower molecular weight and/or a lower degree of hydrolysis (e.g., partially hydrolyzed) or that include a plasticizer (e.g., a polyol plasticizer), such as the Mowiflex C 30 compound, are particularly well-suited for use in manufacturing such flexible components, although other PVA compounds are also suitable. The C 30 compound is both flexible enough that it can be utilized to form components that are used to generate fluid tight seals and strong enough to maintain such fluid tight seals even at the elevated pressures that are observed in downhole operations such as hydraulic fracturing.

While the described plug 400 may be constructed completely from PVA materials, in one embodiment, certain components may be wholly constructed from other materials (either degradable or non-degradable). For example, one or more of the components of the plug 400 may be wholly constructed from another degradable material such as a degradable metal or a different degradable polymer. Likewise, one or more components of the plug 400 may be wholly constructed from a non-degradable material. For example, it may be desirable to form components such as slips 414 and 422, which are configured to engage an interior wall of a conduit to maintain the position of the plug 400 within the conduit, from a non-degradable metal. Likewise, the slips 414 and 422 may be formed primarily from a degradable metal, but the gripping surface (i.e., the surface that engages the conduit) may be formed from an abrasive material such as Tungsten carbide. In such an embodiment, the abrasive material may be deposited onto the degradable composite metal material using a deposition process such as cold-spray deposition or by using an electroplating process. Similarly, while sealing element 418 may be made degradable by forming it from a PVA compound as described above, it may be desirable in some applications to utilize a more traditional material for sealing such as nitrile rubber.

In another embodiment, one or more of the components of the plug 400 may be partially formed from materials other than PVA compounds. For example, while slips 414 and 422 are depicted with integral teeth (i.e., the slips are depicted as a single component having teeth), in one embodiment, the slips 414' and 422' may be formed from a PVA compound and may be designed with recessed pockets 428 in which teeth formed of a more traditional gripping material (e.g., a metal or ceramic material) may be inset (e.g., with an epoxy). This may allow the main body of the slips 414' and 422' to be degradable while the portion that contacts the conduit may be formed from a material that is better-suited for gripping a metallic surface such as the interior of a conduit.

In another embodiment in which a component of the plug 400 may be partially formed from materials other than a PVA compound, an alternative mandrel 410' may include a central insert 432 that is formed from a PVA compound while the exterior portion of the mandrel 410' is formed from a non-degradable material. In such an embodiment, the other plug components (i.e., the components other than the mandrel 410') may also be formed from non-degradable materials. For example, the heavy-walled portion of a traditional mandrel 410 (i.e., the interior portion of the mandrel from the ball seat 430 to the bottom of plug 400) may be replaced with the insert 432. In such an embodiment, the mandrel 410' may be machined with internal threads (not shown) to accept complementary external threads (not shown) that are machined into the insert 432. The resulting plug may be permanently maintained in a well, while a degradable ball (such as PVA ball 434) and the insert portion 432 of the mandrel 410' degrade to create a large bore in the permanent mandrel 410' to facilitate flow through the plug after use in a downhole operation such as hydraulic fracturing.

As will be described below, the ball 434 and the components of the plug 400 may be formed using an injection molding process. Likewise, the ball 434 and the components of the plug 400 may be formed using an extrusion process and then machined (if necessary) to a final form. Moreover, and as mentioned above, ball 434 and plug 400 are illustrated only as an example of the types of tools and components that can be created from PVA compounds using the injection molding and extrusion processes described below. Other examples of tools that may be created from a PVA compound using the disclosed processes include cement retainers, sliding sleeve devices, and other isolation tools.

Figure 5:
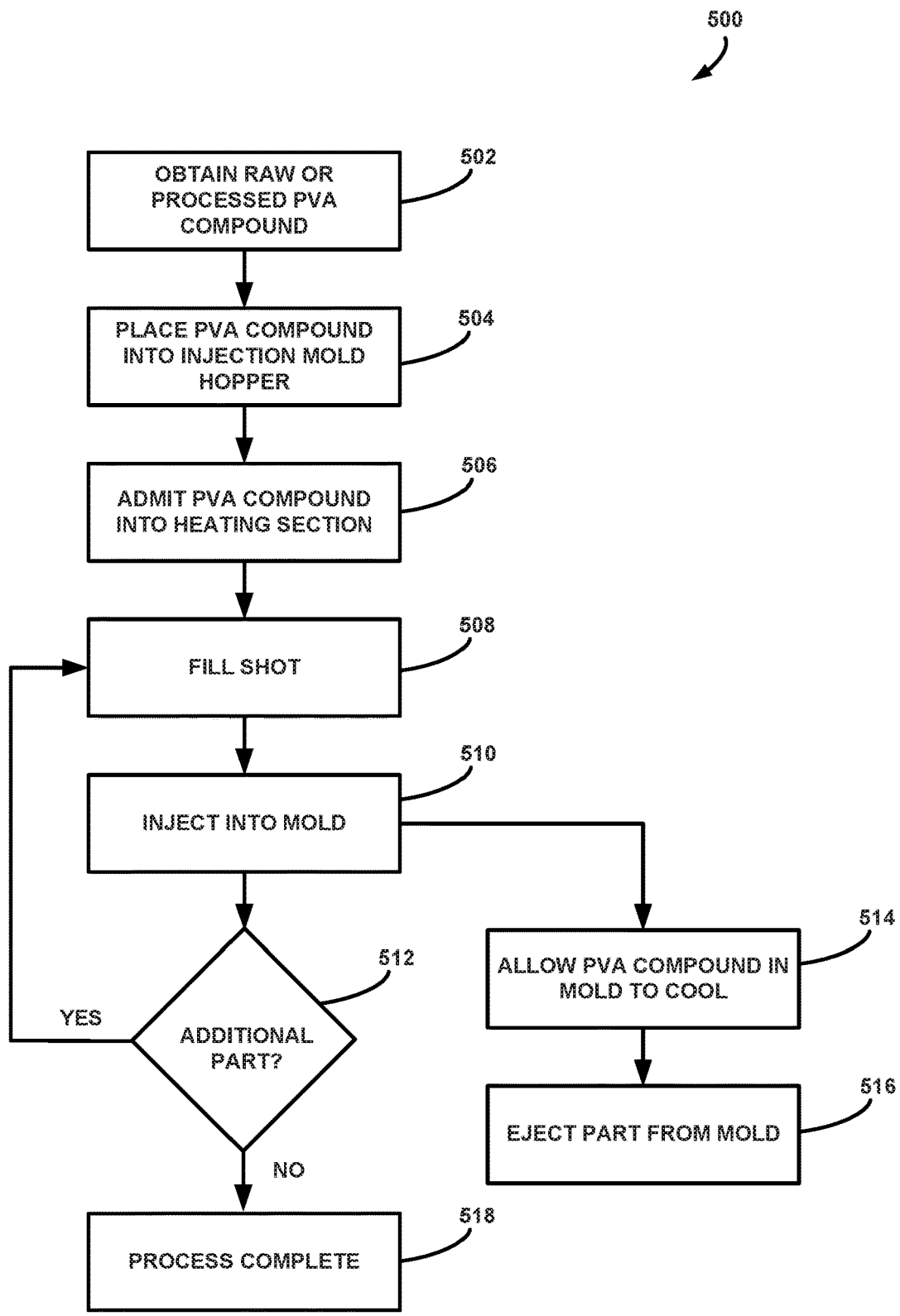
FIG. 5 is a flowchart that illustrates the steps of an injection molding process for producing tools and other components from a degradable material in accordance with an embodiment of this disclosure.

Referring to FIG. 5, a flow chart illustrates the steps in a process 500 for producing tools, tool components, and balls from a PVA compound by injection molding. Initially, a desired raw or processed PVA compound is obtained (step 502), typically in a pellet or powder form. It is beneficial at this point to discuss the different processing that can be performed to obtain the various types of processed PVA compounds that may be utilized in the injection molding and extrusion processes.

As described above, a reinforcing material can be integrated into a raw PVA compound to improve strength. The reinforcing material may include fiberglass, carbon fiber, an aramid fiber such as Kevlar, Basalt fiber, or other similar reinforcing materials. In one embodiment, the raw PVA compound is processed to generate a long fiber reinforced PVA compound. Long fiber reinforced materials are defined by their incorporation of substantially parallel fibers (such as glass fibers) that are all of the same length as each other and as the plastic component (e.g., the pellet). Long fiber reinforced polymer pellets are typically produced by a specialty provider through a process such as pultrusion, which essentially results in the coating of the reinforcing fiber with the raw or processed polymer compound. The Kuraray Mowiflex C 17 raw PVA compound and other similar raw PVA compounds are well-suited for use in creating a long fiber reinforced PVA compound to be used to form rigid components. In one embodiment, the long fiber reinforced PVA compound is 50 wt % fiberglass. However, the fiberglass content may range from 5-60 wt %. In one embodiment, the long fiber reinforced PVA pellets have a diameter of ⅛" and a length of ½" (e.g., similar to a grain of rice).

In contrast to long fiber reinforced materials, short fiber reinforced materials are defined by their incorporation of various lengths of fibers that are randomly oriented within the plastic material. PVA compounds can also be processed to generate a short fiber reinforced PVA compound. Short fiber reinforced PVA compounds can be created during the compounding stage, the injection molding process 500, or extrusion process 600 by mixing short glass fibers with the PVA compound in the injection molding or extrusion hopper. As with long fiber reinforced PVA compounds, short fiber reinforced PVA compounds may include a fiberglass content of 50 wt %, or a fiberglass content within a range from 5-60 wt %. The short and long fiber reinforced PVA compounds may include multi-compatible, standard e-glass solid fibers that are 17 microns in filament diameter, although other sizes (such as 5-17 micron diameter) and types of fibers may also be used. The content of reinforcing material may be altered to obtain desired strength and specific gravity measures of components generated from the processed PVA compound.

PVA compounds can also be processed by blending the PVA compound (such as the above-described C 17, C 30, and H 15 compounds) with another polymer (i.e., a blend polymer). For example, the PVA compound can be blended with a polymer such as Nylon-6, PGA, PLA, and/or polyethylene to obtain desired properties (e.g., degradation rate, specific gravity, tensile strength, etc.). In particular, it has been observed that blending a PVA compound with Nylon-6 (PA6 or polycaprolactam) results in the decrease of degradation rates by as much as 80% (as compared to the non-blended PVA compound) without significantly changing the mechanical properties. The PVA compound may include 1-25 wt % PA6, or, more specifically, between 1-3 wt %, 4-6 wt %, 9-11 wt %, 14-16 wt %, 19-21 wt %, or 24-25 wt % (excluding reinforcing or other fill materials) PA6. When reinforcing or other fill materials are included, the processed PVA compound may include approximately 0.5-24 wt % PA6. PA6 and other polymers are blended with the PVA compound by melting the PVA compound and the blend polymer together in the appropriate ratio and obtaining a uniform mixture. The blending process may be accomplished during the injection molding or extrusion process by mixing the blend polymer with the PVA compound in the hopper in the desired ratio. The blending process may also be accomplished as part of the addition of other materials such as reinforcing materials. For example, a specialty provider of long fiber reinforced pellets may add the blend polymer to the PVA compound during the creation of the long fiber reinforced pellets.

In addition to blend polymers and reinforcing materials, other materials such as colorant and fill materials can be added to PVA compounds. In one embodiment, an ethylene-vinyl acetate (EVA) carrier polymer with a desired color concentrate is added to the PVA compound. Colorants have been added to PVA compounds in ratios of 0-3 wt % (excluding reinforcing or other fill materials but including any blend polymers). A colorant can be used to generate a PVA compound having a color that distinguishes it from other grades or types. Fill materials such as talc, calcium carbonate, glass powder, glass spheres, gas bubbles, or other metal or ceramic powder can also be added to the PVA compound in ratios of 5-60 wt % to obtain desired characteristics such as specific gravity. In one embodiment, the specific gravity of components produced from the PVA compound may be reduced by incorporating hollow glass spheres to create void spaces. Injecting gas bubbles into the melt using a process like MuCell by Trexel Corporation can also decrease the apparent specific gravity of the finished product without compromising strength. Alternatively, metal powders, degradable and not, can be added to the polymer to increase the apparent specific gravity of the finished product. Like blend polymers and reinforcing material, fill materials and colorants can be added to the PVA compound during the injection molding process 500 or the extrusion process 600 or during the addition of reinforcing material. Colorants and fill materials may also be present in raw PVA compounds. While several different types of processed PVA compounds have been described, tools, tool components, and balls may also be produced from raw PVA compounds using the injection molding process 500 and the extrusion process 600.

The obtained raw or processed PVA compound (as well as any additional materials that are to be added during the injection molding process 500) is placed into the hopper of an injection molding machine (step 504) from where it is admitted into a heating section of the injection molding machine (step 506). In one embodiment, the heating section of the injection molding machine includes six to eight heater bands, although more or fewer heater bands might also be used. The heating section imparts thermal energy into the PVA compound and creates a molten PVA mixture that is conveyed through the heating section. The PVA material is conveyed through the heating section by a screw. In one embodiment, the temperature of each band of the heating section can be individually controlled. In one embodiment, the heater bands are controlled to increase the temperature from approximately 380° F. at the first heater band (i.e., the heater band closest to the hopper) to 400° F. at the last heater band (i.e., the heater band closest to the shot), although other temperature settings and gradients may be appropriate depending on the properties of the specific PVA compound.

As the molten PVA compound is conveyed through the heating section (i.e., via the rotation of the screw), it begins to fill the shot (step 508). The shot is a portion of the injection molding machine between the end of the screw that conveys material through the heating section and the entrance to the mold (i.e., the gate). The material in the shot is injected into the mold (step 510) by sliding the screw forward towards the shot. Typically, the volume of the shot slightly exceeds the volume of the mold such that the screw does not bottom out (i.e., there is always some material in the shot). It will be understood that a mold can be created to form practically any three dimensional component from the PVA compound. For example, any of the components of the plug 400 illustrated in FIG. 4 can be created via the injection molding process 500. The inventor has determined that the injection molding process 500 is particularly well-suited for the formation of balls 434 from a processed PVA compound containing long fiber fiberglass reinforcing material (with or without additional fill materials, colorants, etc.). Typically, the mold is made of either steel or aluminum, although other mold materials might also be employed. In one embodiment, the mold for ball 434 includes a feature such as an annular dovetail opposite the entrance to the mold to provide a pulling surface that allows the ball 434 to be extracted without damaging the portion of the ball 434 nearest the entrance of the mold. Similar features may also be included in molds for other components. The resulting features may then be removed from the completed part during final processing.

In one embodiment, the PVA compound in the shot is transferred into the mold through a large orifice. For example, the orifice may have a diameter of ⅜". Using a large orifice decreases the shear forces exerted on the PVA compound and reduces the likelihood that any included reinforcing materials such as glass fibers will fracture as the material is introduced into the mold. For the same reasons, the rate of injection into the mold (as determined by the rate of advancement of the screw into the shot) may also be decreased to a very slow rate. For example, the PVA compound may be introduced into the mold at a rate of approximately 0.01 in$^3$/sec. After the mold has been completely filled, the screw may exert and hold high pressure on the material in the mold. In one embodiment, the pack and hold pressure exerted by the screw is 20,000 psi. In another embodiment, the pack and hold pressure exerted by the screw may range from 10,000 psi to 20,000 psi, although other settings may also be used. The pack and hold pressure may be varied to slightly vary the specific gravity of the injection molded component.

After the screw is held in place to maintain the pack and hold pressure for several seconds, the material in the gate (the entrance to the mold cavity) begins to solidify. When this occurs, the screw may begin to be retracted. The PVA compound in the mold is allowed to cool to form a solid component (step 514). The residence time in the mold is dependent upon the volume of the PVA compound in the mold as well as the content of reinforcing material. Molds with larger volumes and PVA compounds having a higher content of reinforcing materials require longer residence times in the mold to solidify. By way of example, a 50 wt % fiberglass ball having a diameter of 3½" to 4" may require approximately 3-4 minutes of residence time to solidify while a 50 wt % fiberglass ball having a diameter of 2" may require 1-2 minutes of residence time to solidify. When the PVA compound in the mold has been allowed to cool for the proper time, the component may be removed from the mold (step 516). If an additional component is to be created (the "Yes" prong of step 512), the shot is refilled (step 508) as the screw is retracted (i.e., the screw is rotated to introduce material into the shot as it is retracted). In one embodiment, the shot is refilled at the same rate as the screw is retracted. Moreover, the screw may be retracted at a rate that corresponds to the residence time of the component in the mold. As such, when a component is ejected from the mold, the shot may be full of PVA compound material that can be introduced into the mold to form the next component. When no additional components are to be molded (the "No" prong of step 512), the process is complete (step 518).

As set forth above, the described injection molding process 500 may be utilized with any number of molds to create components having practically any imaginable features. While nearly any size and shape of components can be created using the injection molding process 500, ball molds may be created for standard sized balls having diameters from ⅞" to 5" in ⅛" intervals.

It has been observed that the injection molding process 500 results in a random orientation of glass fibers in the molded components. It has also been determined that this random fiber orientation results in desirable strength characteristics. Thus, the injection molding process 500 may be particularly well-suited for generating rigid structural components.

Figure 6:
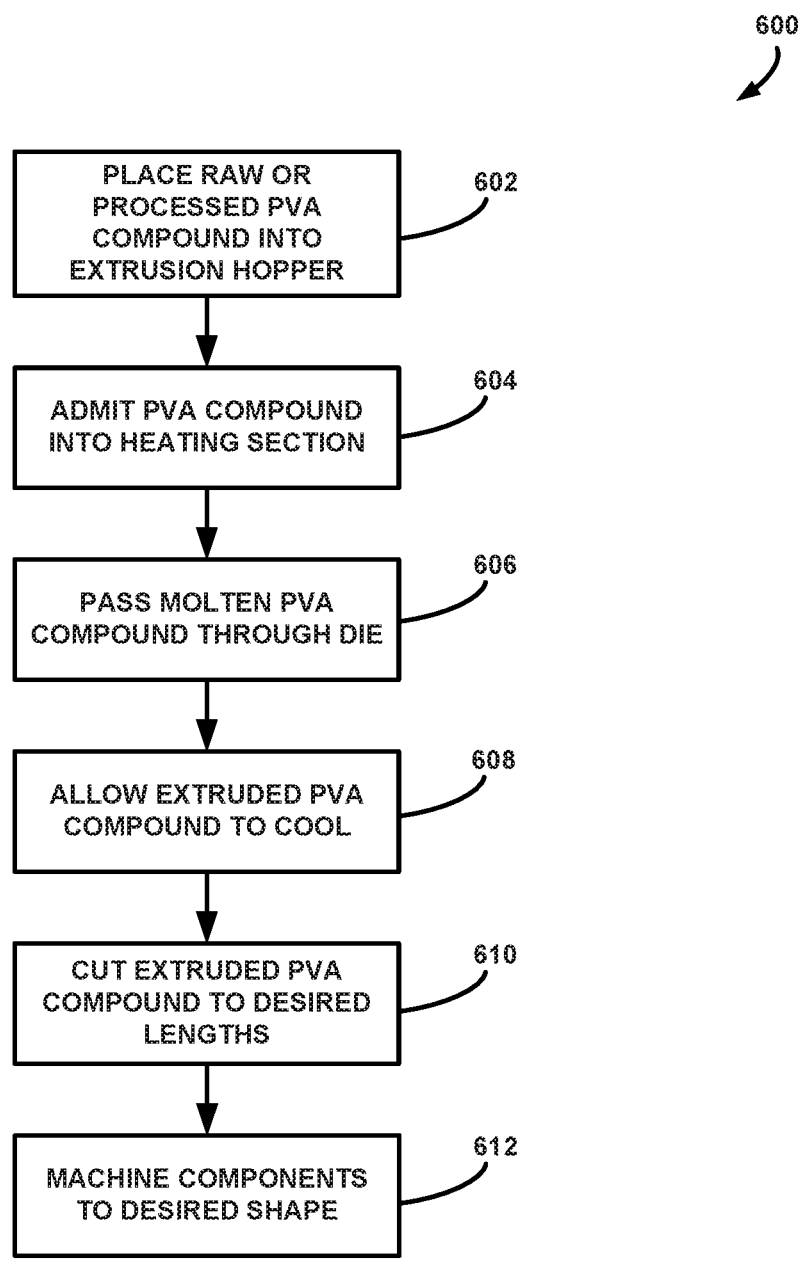
FIG. 6 is a flowchart that illustrates the steps of an extrusion process for producing tools and other components from a degradable material in accordance with an embodiment of this disclosure.

Referring to FIG. 6, a flow chart illustrates the steps in a process 600 for producing tools, tool components, and balls from a PVA compound by extrusion. Initially, a raw or processed PVA compound (as well as any additional materials that are to be added during the extrusion process 600) are placed into the hopper of an extrusion machine (step 602). Similar to the injection molding process 500, the pellets are admitted from the hopper into a heating section (step 604). Also like the injection molding process 500, the heating section may include multiple heater bands each having independent temperature control. In one embodiment, the first heater band (the heater band closest to the hopper) may be controlled to 380° F. and the last heater band (the heater band closest to the die) may be controlled to 400° F., although other temperature settings and gradients may be appropriate depending on the properties of the specific PVA compound. The molten PVA compound is conveyed through the heating section by the rotation of a screw. Because extrusion is a continuous process (whereas injection molding is a batch process), the rate at which the molten PVA compound is conveyed through the heating section is also the rate at which the material is passed through a die, which creates the desired two dimensional profile of the extruded component (step 606). As the extruded PVA compound exits the die, it cools and solidifies (step 608). For components having a large cross-sectional area, the extrusion rate must be decreased to allow the extruded PVA compound to cool and solidify. For components having a smaller cross-sectional area, the extrusion rate may be increased. By way of example, a 5" diameter cylindrical bar may be extruded at a rate of 8" per hour while a 2" diameter cylindrical bar may be extruded at a rate of 12" per hour. When a desired length of extruded PVA compound has been passed through the die and allowed to solidify, the extruded PVA compound is cut (step 610).

To create the finished component, the extruded PVA compound is then machined to its final shape (step 612). In one embodiment, machining an extruded component may include machining a ball 434 from a cylindrical bar. In another embodiment, machining an extruded component may include removing stock and/or cutting threads into a pipe-shaped extrusion. For example, mandrel 410 may be formed as a pipe-shaped extrusion having a thick wall (e.g., having a wall thickness along its entire length that is equal to the wall thickness at the bottom of the mandrel 410) from which stock is removed to generate the ball seat 430 and to incorporate threads for conveying the plug 400 into a well. Similarly, the mandrel insert 432 described above may be formed from a pipe-shaped extrusion (i.e., a cylindrical extrusion with an axial bore) that is machined to include external threads for insertion into the main body of the mandrel.

The finished components generated by the injection molding process 500 or the extrusion process 600 may be annealed to increase the crystallinity of the PVA compound and to remove stresses and defects. The annealing process involves heating the finished component to between 300° F. and 400° F., holding the component at the elevated temperature for approximately 1-3 hours, and then allowing the component to be cooled to ambient temperature (approximately 70° F.). The finished components may be heated in an annealing oven or in a liquid heat transfer medium such as a heat transfer oil. Annealing has been observed to modify the degradation rates of finished components formed from PVA compounds.

As will be understood, extrusion process 600 may be preferred to injection molding process 500 for components that have a generally uniform cross-sectional profile due to its continuous nature (i.e., more components may be produced in a given amount of time via extrusion as opposed to injection molding). For example, mandrel 410, shoulders 412 and 424, cones 416 and 420, sealing element 418, and similarly-shaped components may all be good candidates for generation via the extrusion process 600. Likewise, ball 434 may be produced via the extrusion process 600. However, because the extrusion process 600 almost always requires the removal of some stock to generate the final components, there is some wasted material. Moreover, while the injection molding process 500 has been observed to generate a random orientation of reinforcing material (e.g., glass fibers) in the molded components, the extrusion process 600 results in reinforcing material orientations that are aligned with the extrusion direction or transverse to the extrusion direction depending upon the extrusion rate. Therefore, the beneficial effects of the random orientation of reinforcing material that are observed in injection molded components (i.e., strength in all loading directions) may not be observed in extruded components. However, because the extrusion process 600 can be controlled to cause reinforcing materials to be oriented in a desired orientation, the extrusion process may be ideally suited for producing components that are to be compressed in the extrusion direction or transverse to the extrusion direction. Additionally, production of components via the extrusion process 600 may be well-suited for use in the creation of non-reinforced components, such as, for example, a non-reinforced sealing element 418, which may be formed from a pipe-shaped extrusion.

As described herein, PVA compounds exhibit strength and degradability properties that render them well-suited for use in the formation of degradable downhole tools, tool components, and balls. The disclosed manufacturing processes can be utilized to form such tools, tool components, and balls in an almost unlimited number of shapes, sizes, and arrangements.

Raw PVA compounds may include 70-100 wt % PVA. More specifically, raw PVA compounds may include 70-75 wt %, 75-80 wt %, 80-85 wt %, 85-90 wt %, 90-95 wt %, or 95-100 wt % PVA. As described above, reinforcing materials may represent 5-60 wt % of a processed PVA compound, which may also include other fill materials and/or blend polymers. Processed PVA compounds used to create the tools, tool components, and balls described in the present application may include 20-95 wt % PVA. More specifically, processed PVA compounds may include 20-30 wt %, 30-40 wt %, 40-50 wt %, 50-60 wt %, 60-70 wt %, 70-80 wt %, 80-90 wt %, or 90-95 wt % PVA.

The inventor has noticed that while degradable downhole tools, tool components, and balls (collectively "degradable downhole components) comprising the processed and unprocessed PVA compounds described above are well-suited for applications conducted in fresh and low-salinity downhole environments, the degradability of the materials may sometimes suffer in high-salinity environments. For example, the salinity of produced formation water in some areas, such as the Permian basin and Bakken formation, may approach 300,000 mg/L or higher of total dissolved solids, nearly 10 times the salinity of sea water. When such high-salinity produced water is used for fracking, it has been observed that the above-described degradable downhole component may not adequately degrade. Instead, in some instances, the degradable downhole components partially degrade and form a tacky substance that can complicate the downhole operations.

Accordingly, the inventor has developed further degradable PVA compounds suitable for degradable downhole components for use in such high-salinity environments. The high-salinity degradable materials comprise unprocessed or processed PVA, as described above, blended with a degradable metal. For example, the PVA polymers that are combined with the degradable metal may be raw PVA, fiberglass reinforced PVA, and/or mineral filled PVA (for example, blended with a mineral fill of about 5%-60%). Examples of suitable mineral fills include pulverized glass, solid glass spheres, hollow glass spheres, barium sulfate, calcium carbonate, calcium sulfate, mica, pigments and dispersions, precipitate silica, talc, titanium dioxide, wollastonite, clays, aluminum hydroxide, magnesium hydroxide, magnesium hydroxide, natural calcium carbonate and dolomite, kaolin, fumed silica, cristobalite, quartz, precipitated calcium carbonate, calcined clay, and the like.

Examples of suitable degradable metals include degradable magnesium and/or degradable magnesium alloys. For example, degradable magnesium alloys may comprise magnesium alloyed with one or more elements that act as accelerants, meaning that the added element(s) have a different galvanic corrosion potential than the magnesium. Examples of suitable accelerants include aluminum, zinc, iron, copper, tungsten, nickel, zinc, zirconium, and the like. One example of a suitable degradable alloy is magnesium doped with 0.001% to 20% nickel. Other examples of suitable degradable metals are disclosed in United States Patent Publication No. 2018/0016662 A1, the entire contents of which are incorporated herein by reference.

According to some embodiments, the degradable metal is provided in a form that can be readily blended into a PVA material. For example, the degradable metal may be a flake, a powder, a chip, or the like. According to some embodiments, the degradable metal is added to the PVA by compounding the degradable metal as a masterbatch in a carrier polymer, which can be mixed with the base PVA material at the extruder step. A masterbatch of the degradable polymer may comprise 50-100 wt. % of the degradable metal compounded with a carrier. Examples of suitable carriers include PVOH, nylon, polystyrene, EVA, and virtually any polymer that is miscible with PVOH. Alternatively, degradable metal may be added directly to the PVA at the extruder step. Still alternatively, the degradable metal may be added to the PVA during a toll-processing step, for example, the at same stage at which colorants, fibers, and/or other mineral fills are added to the PVA.

According to some embodiments, the degradable metal may be treated with a fluid to prevent oxidation of the degradable metal and/or to prevent the degradable metal from auto-igniting during processing, such as during extrusion. Examples of treating fluids include fluids comprising hydrotreated hydrocarbons such as hydrotreated heavy naphtha (petroleum) and distillates thereof.

As mentioned above, any of the PVA materials described above may be blended with the degradable alloy to form materials suitable high-salinity degradable downhole components. One particularly suitable class of PVA materials is the processed PVA that includes fiberglass reinforcing materials, as described above. In particular, long fibers in the PVA material may serve to wick water into the material so that the degradable metal that is not exposed to the surface of the tool begins to dissolve. According to some embodiments, the degradable metal may be blended with the PVA material at a loading of 0.01 to 75%. According some embodiments, the loading may be 2 to 50%, or 10 to 30%. One exemplary embodiment is a loading of 2.5% degradable metal to PVA material.

The non-fiber-reinforced PVA materials can also be blended with the degradable metals, as described above. For example, one particularly suitable embodiment comprises a blend of the Kuraray Mowiflex C 17 and Kuraray Mowiflex H 15 (each described above) further blended with the degradable metal. According to one embodiment, the blend comprises 75% H 15 and 25% C-17. The blend may comprise 5%-60% mineral fill or may not comprise mineral fill.

Tools comprising the PVA materials and degradable metal may be manufactured using any of the manufacturing processes described above. Examples include injection molding, casting, compression molding, profile extrusion, and the like.

The inventor has observed that tools made of the high-salinity degradable PVA materials exhibit strength and degradability properties that render them well-suited for use in high-salinity environments. Ionic PVA dissolves slower in high-salinity water because the elements that provide salinity (e.g., CaCl, NaCl, KCl, etc.) have a stronger attraction to the —OH groups of the PVA than does water. Without being bound by theory, it is believed that the degradable metal incorporated into the PVA material reacts with salt in the high-salinity medium exothermically producing hydrogen. Galvanic corrosion of the metal results in voids in the polymer, accelerating the hydrolyzation of the polymer. In the case of degradable magnesium/magnesium alloy, magnesium hydroxide is produced, which may temporarily crosslink the PVA polymer, rendering the dissolved polymer non-sticky and less likely to reform. The polymer in this instance degrades mechanically rather than solely chemically, as is the case in PVA used in fresh water environments. As the metal particles degrade, voids are created in the polymer component. The increased surface area of the polymer creates more opportunities for water to attack the —OH groups in the polymer, thereby increasing the dissolution rate.

The disclosed degradable metal-containing PVA-based tools are capable of performing in high salinity environments where previous degradable polymer tools are unsuitable. For example, prior art degradable tools based on polymer acids such as polyglycolic acid (PGA), polylactic acid (PLA), or other polymer acids typically need temperatures of greater than about 150° F. to dissolve. In many applications, the volumes of fracturing fluids injected tend to cool the temperature of the tool environment to less than that, and thus, adequate degradation is not achieved with polymer acid-based tools (even those compounded with degradable metal). Thus, according to some embodiments, the degradable tools do not comprise any polymer acids, such as PGA, PLA, PGLA, or the like. Moreover, according to some embodiments, the materials do not contain any degradation promoters or degradation triggers, i.e., any organic or inorganic substances that promote degradation of the degradable resin and the reactive metals, other than the degradable metal itself.

By contrast, the presently disclosed tools comprising PVA and degradable metal adequately degrade in high salinity environments at temperatures as low as 65° F. Moreover, the disclosed tools degrade without producing sticky or gummy residues that can cause problems within the downhole environment.

It will be appreciated that degradable downhole tools suitable for use in high salinity environments are disclosed herein. The downhole tools comprise a PVA material and a degradable metal blended therein. Also disclosed herein are methods of using and degrading such tools within a high salinity downhole environment. A tool can be deployed within a wellbore that traverses a formation, wherein the wellbore comprises an aqueous fluid having high salinity. The fluid may be a fluid produced by the formation or the fluid may be a fluid that is pumped into the wellbore, such as a fracturing fluid. According to some embodiments, the fluid may have a salinity of about 0% to about 46%, about 0% to 3.3%, or about 3.3% to about 30%, or about 3.3% to about 15%. According to some embodiments, the temperature of the fluid within the environment of the down hole tool may be about 60° F. to about 350° F., about 90° F. to about 120° F., about 60° F. to about 120° F., or about 60° F. to about 80° F. According to some embodiments, the temperature of the fluid within the environment of the down hole tool may be less than 120° F., or less than 100° F., or less than 80° F.

Once deployed, the fluid(s) present in the wellbore are allowed to react with the components of the downhole tool. According to some embodiments, the fluid reacts with the degradable metal to produce voids in the tool material and to produce reaction products of the degradable metal. For example, according to some embodiments, the degradable metal is a degradable magnesium alloy and the reaction products are hydrogen and magnesium hydroxide. The magnesium hydroxide may react to temporarily crosslink PVA and/or PVA degradation products, causing them to agglomerate into a powder instead of forming tacky residues that might otherwise contaminate other downhole operations. The voids produced in the tool increase the surface area and accelerate the degradation of the tool. The inventors have found that the addition of dissolvable metal to the PVA polymer can return the degradation rate of the polymer in high-salinity water to the rate of degradation seen in fresh water.

The inventors have found that downhole tools made of the high-salinity PVA materials described herein are capable of dissolving at a high rate at relatively low temperature fluids having a high salinity. For example, the disclosed tools may have a rate of dissolution (ROD) (a.k.a. rate of corrosion (ROC)) of greater than 0.5 mg/cm$^2$/hour when exposed to stagnant water with a salinity of 5% or greater and a temperature of less than 80° F. According to some embodiments, the ROD is 0.5 to 50 mg/cm$^2$/hour in stagnant water with a salinity of 10% and a temperature of 70° F. According to some embodiments, the ROD is 1 to 10 mg/cm$^2$/hour under the same conditions. According to some embodiments, the ROD is 1 to 5 mg/cm$^2$/hour under the same conditions.

It should be noted that, while the high-salinity PVA materials and downhole components made thereof are particularly well suited for use in high-salinity environments, they may be used in other environments, such as conventional downhole environments as well.

The foregoing disclosure and the showings made of the drawings are merely illustrative of the principles of this invention and are not to be interpreted in a limiting sense.

What is claimed is:

1. A downhole tool, comprising:
   at least one component made of a composite PVA material, wherein the composite PVA material is selected from the group consisting of:
   (1) composite PVA materials consisting of polyvinyl alcohol (PVA) and a degradable metal;
   (2) composite PVA materials consisting of PVA, a degradable metal, and fiberglass reinforcing material;
   (3) composite PVA materials consisting of PVA, a degradable metal, and a mineral fill material; and
   (4) composite PVA materials consisting of PVA, a degradable metal, a fiberglass reinforcing material, and a mineral fill material;
   wherein the composite PVA material has a rate of corrosion (ROC) of 0.5 to 50 mg/cm$^2$/hour in an aqueous fluid having a salinity of greater than 5% and a temperature of less than 100° F.

2. The tool of claim 1, wherein the degradable metal is magnesium or a magnesium alloy.

3. The tool of claim 2, wherein the degradable metal is a magnesium alloy comprising magnesium and one or more of aluminum, zinc, iron, copper, nickel, zinc, tungsten, and zirconium.

4. The tool of claim 3, wherein the degradable metal comprises magnesium and nickel.

5. The tool of claim 1, wherein the composite PVA material has 0.01 to 2.5% by weight of the degradable metal.

6. The tool of claim 1, wherein the composite PVA material has between 5 and 60% fiberglass by weight.

7. The tool of claim 1, wherein the mineral fill material is selected from the group consisting of pulverized glass, solid glass spheres, hollow glass spheres, barium sulfate, calcium carbonate, calcium sulfate, mica, pigments and dispersions, precipitate silica, talc, titanium dioxide, wollastonite, clays, aluminum hydroxide, magnesium hydroxide, magnesium hydroxide, natural calcium carbonate and dolomite, kaolin, fumed silica, cristobalite, quartz, precipitated calcium carbonate, and calcined clay.

8. The tool of claim 1, wherein the salinity of the aqueous fluid is at least 10% and the temperature of the aqueous fluid is less than 80° F.

9. The tool of claim 1, wherein the at least one component is selected from the group consisting of a mandrel of a packer or plug, a spacer ring, a slip, a wedge, a retainer ring, an extrusion limiter or backup shoe, a mule shoe, a frac ball, a flapper, a ball seat, a sleeve, a perforation gun housing, a cement dart, a wiper dart, a sealing element, a wedge, a slip block, a logging tool, a housing, a release mechanism, a pumpdown tool, an inflow control device plug, an autonomous inflow control device plug, a coupling, a connector, a support, an enclosure, a cage, a slip body, a tapered shoe, and any combination thereof.

10. The tool of claim 1, wherein the downhole tool is selected from the group consisting of a wellbore isolation device, a completion tool, a drill tool, a testing tool, a slickline tool, a wireline tool, an autonomous tool, and a tubing conveyed perforating tool.

11. The tool of claim 1, wherein the downhole tool further comprises:
a body having an axial bore extending therethrough;
one or more slips arranged about the body and configured to extend radially to engage an interior wall of a wellbore conduit; and
a sealing member configured to form a seal between an outer surface of the body and the interior wall of the wellbore conduit,
wherein the at least one component is selected from the body, the one or more slips, and the sealing member.

12. The tool of claim 11, wherein the at least one component comprises the slips and wherein the slips include one or more pockets configured to accept a gripping material.

13. The tool of claim 12, wherein the gripping material is a metal or ceramic material.

14. A method of dissolving a downhole tool, the method comprising:
disposing the tool in a wellbore, wherein the tool comprises at least one component made of a composite PVA compound comprising polyvinyl alcohol (PVA) and a degradable metal;
contacting the tool with an aqueous fluid having a salinity of greater than 5% and a temperature of less than 100° F., wherein
the tool has a rate of corrosion (ROC) of 0.5 to 50 mg/cm²/hour.

15. The method of claim 14, wherein the fluid has a salinity of 10% or greater.

16. The method of claim 14, wherein the fluid has a temperature of less than 80° F.

17. The method of claim 14, wherein the tool has a ROC of 0.5 to 50 mg/cm2/hour in fluid having a salinity of at least 10% and a temperature of less than 80° F.

18. A downhole tool, comprising:
at least one component made of a composite PVA material, wherein the composite PVA material is selected from the group consisting of:
(1) composite PVA materials comprising polyvinyl alcohol (PVA) and a degradable metal;
(2) composite PVA materials comprising PVA, a degradable metal, and fiberglass reinforcing material;
(3) composite PVA materials comprising PVA, a degradable metal, and a mineral fill material; and
(4) composite PVA materials comprising PVA, a degradable metal, a fiberglass reinforcing material, and a mineral fill material;
wherein the composite PVA material has a rate of corrosion (ROC) of 0.5 to 50 mg/cm²/hour in an aqueous fluid having a salinity of greater than 5% and a temperature of less than 100° F.

19. The tool of claim 18, wherein the degradable metal is magnesium or a magnesium alloy.

20. The tool of claim 19, wherein the degradable metal is a magnesium alloy comprising magnesium and one or more of aluminum, zinc, iron, copper, nickel, zinc, tungsten, and zirconium.

21. The tool of claim 20, wherein the degradable metal comprises magnesium and nickel.

22. The tool of claim 18, wherein the composite PVA material has 0.01 to 2.5% by weight of the degradable metal.

23. The tool of claim 18, wherein the composite PVA material has between 5 and 60% fiberglass by weight.

24. The tool of claim 18, wherein the mineral fill material is selected from the group consisting of pulverized glass, solid glass spheres, hollow glass spheres, barium sulfate, calcium carbonate, calcium sulfate, mica, pigments and dispersions, precipitate silica, talc, titanium dioxide, wollastonite, clays, aluminum hydroxide, magnesium hydroxide, magnesium hydroxide, natural calcium carbonate and dolomite, kaolin, fumed silica, cristobalite, quartz, precipitated calcium carbonate, and calcined clay.

25. The tool of claim 18, wherein the salinity of the aqueous fluid is at least 10% and the temperature of the aqueous fluid is less than 80° F.

26. The tool of claim 18, wherein the at least one component is selected from the group consisting of a mandrel of a packer or plug, a spacer ring, a slip, a wedge, a retainer ring, an extrusion limiter or backup shoe, a mule shoe, a frac ball, a flapper, a ball seat, a sleeve, a perforation gun housing, a cement dart, a wiper dart, a sealing element, a wedge, a slip block, a logging tool, a housing, a release mechanism, a pumpdown tool, an inflow control device plug, an autonomous inflow control device plug, a coupling, a connector, a support, an enclosure, a cage, a slip body, a tapered shoe, and any combination thereof.

27. The tool of claim 18, wherein the downhole tool is selected from the group consisting of a wellbore isolation device, a completion tool, a drill tool, a testing tool, a slickline tool, a wireline tool, an autonomous tool, and a tubing conveyed perforating tool.

28. The tool of claim 18, wherein the downhole tool further comprises:
a body having an axial bore extending therethrough;
one or more slips arranged about the body and configured to extend radially to engage an interior wall of a wellbore conduit; and
a sealing member configured to form a seal between an outer surface of the body and the interior wall of the wellbore conduit,
wherein the at least one component is selected from the body, the one or more slips, and the sealing member.

29. The tool of claim 28, wherein the at least one component comprises the slips and wherein the slips include one or more pockets configured to accept a gripping material.

30. The tool of claim 29, wherein the gripping material is a metal or ceramic material.

\* \* \* \* \*